May 16, 1933.  P. D. MERRILL  1,909,297
PIPE JOINT SEALING DEVICE
Filed Nov. 20, 1930  2 Sheets-Sheet 1
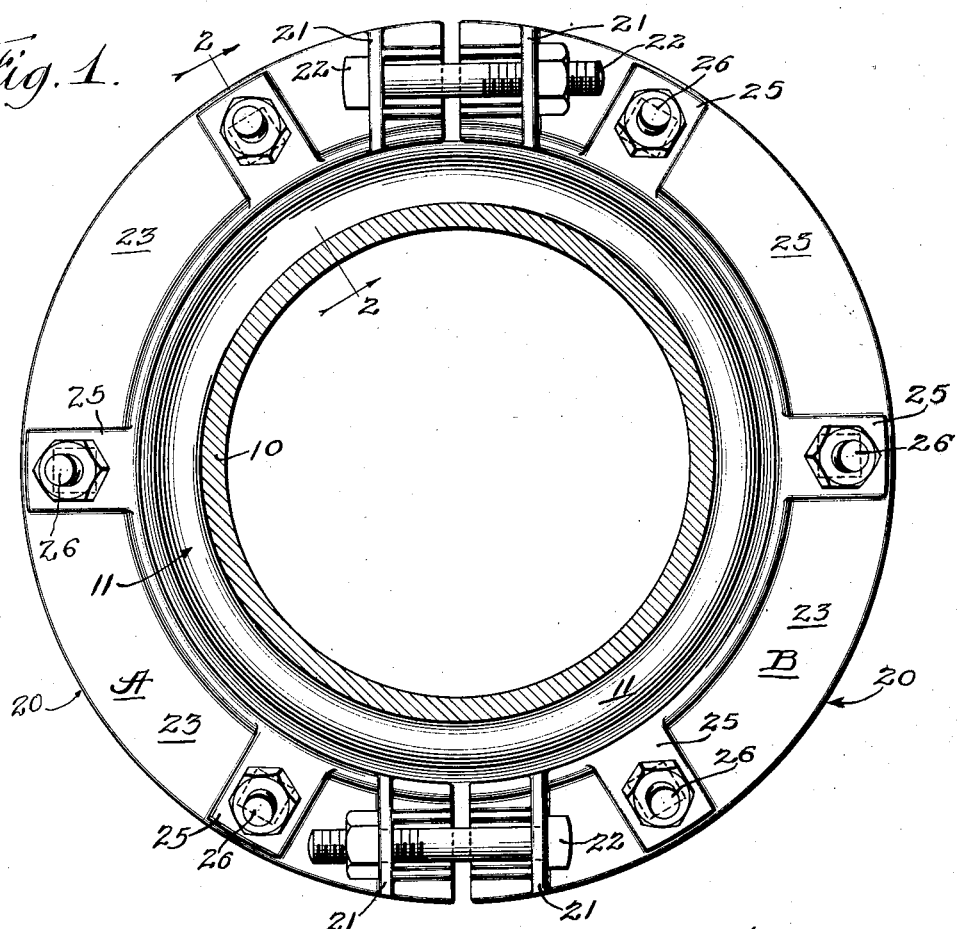
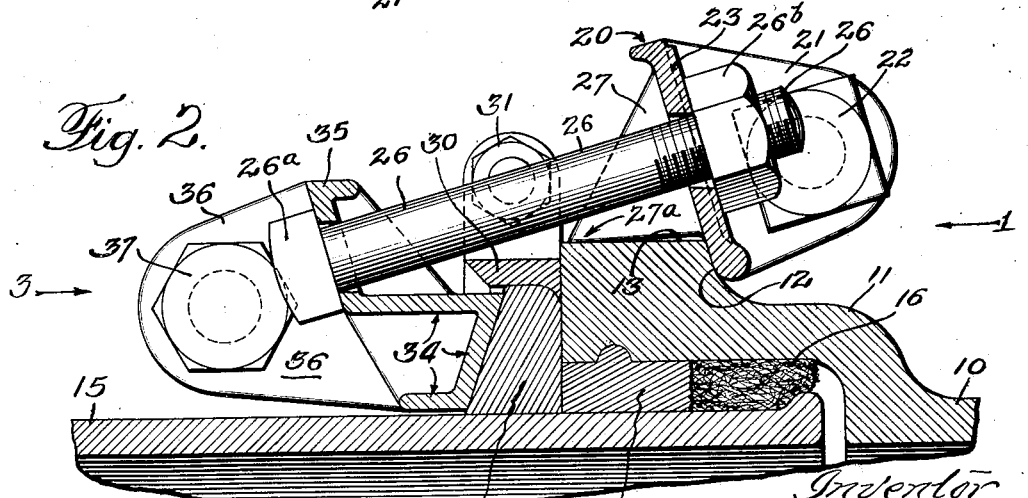

May 16, 1933.  P. D. MERRILL  1,909,297
PIPE JOINT SEALING DEVICE
Filed Nov. 20, 1930  2 Sheets-Sheet 2
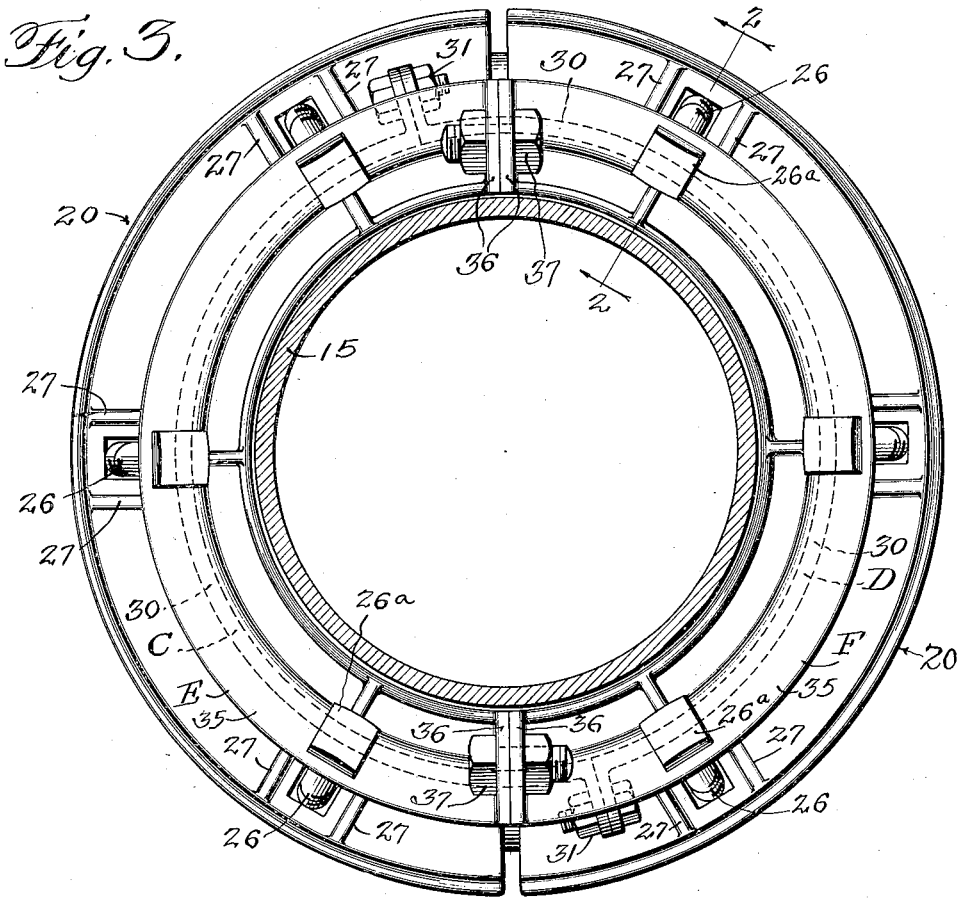
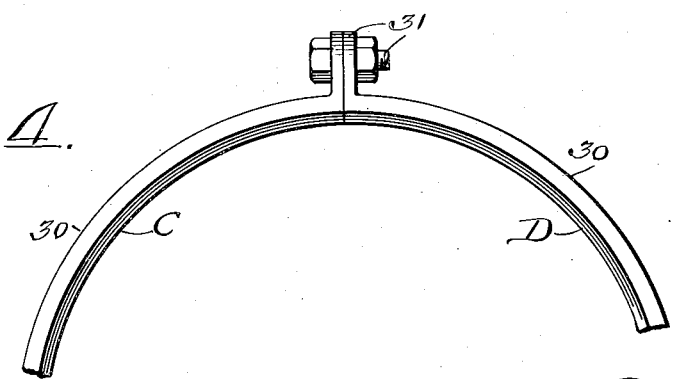
Inventor
Patterson D. Merrill
By Luther Johns
Atty.

Patented May 16, 1933

1,909,297

UNITED STATES PATENT OFFICE

PATTERSON D. MERRILL, OF SOUTH BEND, INDIANA, ASSIGNOR TO M. B. SKINNER CO., OF SOUTH BEND, INDIANA, A CORPORATION OF INDIANA

PIPE JOINT SEALING DEVICE

Application filed November 20, 1930. Serial No. 496,838.

This invention relates to devices for sealing the joints of pipes to prevent leakage. It is designed especially for use in connection with pipes of the "bell and spigot" type in which the enlarged end or "bell" of one pipe accommodates the "spigot" end portion of the next adjacent pipe, with packing between the overlapped and interfitting portions of the pipes.

The prime object is to provide highly efficient, readily applicable and readily operable means for stopping leaks at such and similar joints. A more specific object is to provide in such a device unusual strength and resistance to distorting strains, while maintaining the weight ordinary or even less than ordinary, and yet affording greater durability and better sealing results. It is an object to provide improved forms of anchoring rings and followers for such devices. Other objects and advantages will appear hereinafter.

In the drawings Figure 1 is a cross sectional view of a pipe having a highly advantageous embodiment of the present improvements thereon in face elevation, the view being in the direction of arrow 1 in Fig. 2;

Fig. 2 is a fragmentary cross section on the line 2—2 of Fig. 3;

Fig. 3 is a cross sectional view similar to Fig. 1 viewed in the direction of the arrow 3 in Fig. 2; and Fig. 4 is a fragment of the confining ring.

The pipe 10, Figs. 1 and 2, has a "bell" or enlargement 11 having an outwardly-and-forwardly directed flaring annular surface at 12, Fig. 2, which intersects the annular cylindrical surface 13 at the end portion of pipe 10.

Inner pipe 15 interfits telescopically with the bell 11. In the annular space between pipes 10 and 15 packing material such as hemp or oakum 16 is first applied, and then hot lead is poured in to provide the seal 17. The foregoing description of the pipes and their joint recites nothing but what is old.

I provide a novel anchoring ring marked 20 as a whole. It is formed in sections A and B, Fig. 1, secured in end-to-end relation by means of lugs 21 through which extend bolts 22. The body 23 of ring 20 is substantially flat and flange-like. A feature of importance is that this body 23 may be much thinner than has heretofore been found feasible in similar devices, and the anchoring ring 20 as a whole is comparatively light in weight.

At spaced-apart intervals on sections A and B thickening lugs 25 are provided through which bolts 26 extend.

The annular inner portions of the body parts 23 rest against the flaring surface 12 (Fig. 2).

Triangular-shaped fulcrum members 27 extend forwardly from the flat plate-like body sections 23, these elements 27 being in pairs as shown in Fig. 1, and the bolts 26 pass between the members of each of these pairs respectively. These fulcrum elements have a bottom which rests upon the surface 13 of pipe 10 until tightening pressure is applied by bolts 26 at which time they tilt up slightly at the rear owing to the fact that the body 23 of the ring slides upward slightly on the slanting surface 12.

The retaining ring 30 is in two sections C and D shown fragmentarily in Fig. 4, these sections being secured end to end by bolts 31. Ring 30 is larger in diameter than pipe 15 to provide a space between its inner surface and pipe 15 to accommodate the sealing material 32, in ring form, and which may be of any suitable gasket material, ordinarily of some special rubber compound well known in the art, and being compressible so as to fill tightly all of the joints around the end of pipe 10 and the outer surface of pipe 15 and the interstices about the lead seal 17.

Means for compressing gasket 32 comprise what I may term a follower proper 34, which is in ring form. It is preferably formed integral with a power-applying ring 35. These parts 34 and 35 are in two sections marked E and F in Fig. 3 and are held together at diametrically opposite places by ears 36 and bolts 37. The ring 35 is apertured to receive the bolts 26 having heads 26a. The nuts 26b operate to draw the follower toward the end of pipe 10 to bring about the desired compression of the packing 32 while ring 30 confines this packing so that the desired compression is had at the various surfaces and joints to be sealed.

In the operation of the device the effect of tightening nuts 26b is to cause the flange-like body 23 of the anchoring ring 20 to slide upward slightly on flaring surface 12, this movement being on the forward ends 27a of the fulcrums 27. This develops tensile strains in ring 20 tending to maintain it in its normal shape.

The result of this construction is that I may make ring 20 comparatively light in weight, with the body part 23 notably thin as compared with what has hitherto been found necessary in anchoring rings in similar devices. Without this principle of developing the tensile strength of the ring such anchoring rings, even when made several times as heavy as is my present ring, become very much distorted and with the distortion become functionally inefficient. I believe I am the first to discover this principle of bringing tensile strains into operation to maintain a body of this type in substantially flat or otherwise normal condition against bending strains imposed substantially at right angles to the tensile strains.

The follower, including the rings 34 and 35, departs in various respects from what has been hitherto known. One important feature is its relation to the anchoring ring 20, being as a whole more inwardly positioned, or nearer to the axis of the pipes, and the bolts 26 inclining downwardly-and-inwardly longitudinally of the pipes in the direction from the anchoring ring to the follower. The power is applied to the follower close to a place or places directly back of the material 32 to be compressed. It is a peculiarly direct application of power in a device of this general type, and in addition to this better mechanical result I avoid the very objectionable tilting or bending action in followers where the power is applied more outward in the radial directions. The follower unit is thus rendered also very compact and of relatively small weight, and the fact that the follower or pusher proper 34 and the ring 35 are integral makes fewer pieces to handle and the device more easily assembled and applied.

It is old to make clamping and follower rings and compression rings in two sections in devices designed for the same or similar purposes, the object being to permit these ring members to be assembled for use on pipes variously located.

The present device is peculiarly efficacious, strong and durable, readily applied, of comparatively light weight and of few parts.

I contemplate as being included in these improvements all such changes, variations and departures from what is thus specifically illustrated and described as fall within the scope of the appended claims.

I claim:

1. A device for sealing a joint at the overlapping and interfitting end portions of bell-and-spigot pipes where the outer or bell end at the joint has an annular outwardly-and-forwardly flaring surface, comprising an anchoring ring adapted to seat against said flaring surface, a retaining ring adapted to surround the inner pipe in spaced relation thereto and to have abutting relation with the overlapping end of the bell, with sealing material in ring form in the space between the inner pipe and said retaining ring, a follower ring adapted to enter said space to apply compression on the sealing material, and means including bolts between the anchoring ring and the follower ring for drawing the anchoring ring and the follower ring toward each other to cause the follower ring to compress said material and to cause the anchoring ring to tend to slide outwardly on said flaring surface to develop tensile strains in the anchoring ring, said bolts inclining inwardly from the anchoring ring to places respectively on the follower ring which are substantially in lines of longitudinally-directed pressure of the follower ring upon the sealing material.

2. The device of claim 1 hereof in which the anchoring ring has fulcrum elements projecting forward from the ring proper and adapted to rest on the outer pipe adjacent to the end thereof.

3. An anchoring ring for a pipe-joint sealing device, comprising a sectional body member in flange-like form having means for holding the sections in end to end arrangement, the sections having forwardly projecting fulcrum elements adapted to rest upon the outer surface of the pipe to which the ring is applied, and having parts inward and rearward of said fulcrum elements adapted to rest against an annular outwardly-and-forwardly flaring surface of the pipe, with means for holding bolts directed substantially at right angles to the general plane of the anchoring ring.

4. An anchoring ring for a pipe-joint sealing device comprising a sectional body member in flange-like form having means for holding the sections in end to end arrangement, the sections having forwardly projecting fulcrum elements adapted to rest upon the outer surface of the pipe to which the ring is applied, and having parts inward of said fulcrum elements adapted to rest against an annular outwardly-and-forwardly flaring surface of the pipe, with means for holding bolts directed substantially at right angles to the general plane of the anchoring ring.

PATTERSON D. MERRILL.